Patented Nov. 10, 1936

2,060,381

UNITED STATES PATENT OFFICE 2,060,381

METALLIFEROUS HYDROXYAZO DYES AND THEIR PRODUCTION

Hermann Schladebach, Dessau in Anhalt, and Herbert Hähle, Dessau-Ziebigk in Anhalt, Germany, assignors to General Aniline Works, Inc., New York, N. Y., a corporation of Delaware No Drawing. Application December 13, 1934, Serial No. 757,400. In Germany December 13, 1933

12 Claims. (Cl. 260—11)

According to this invention, valuable dyes are made by combining with a coupling component a diazotized ortho-aminophenol or a substitution product thereof, containing a hydroaromatic substituent in the nucleus and containing or not further substituents. The dyes are converted into metal compounds by treatment with an agent yielding metal, which treatment may occur before, during or after the application of the dyes for dyeing or coloring. Suitable metal compounds are, above all, those of cobalt and chromium, but there may also be named those of copper, iron and other metals.

When it is required to produce dyes which are soluble in water it will be understood that there must be present in the dye molecule a sulfonic acid group or another group which imparts solubility in water. In the production of dyes which are soluble in fats such groups should not be present.

There are already known azo-dyes which contain a wholly or partially hydrogenated hydrocarbon ring and are made by combining a diazo compound of a mono-aminophenyl-hexahydrobenzene or a di-(aminophenyl)-hexahydrobenzene with an azo dye component containing no group which imparts solubility in water. Moreover, azo dyes containing one or more hydrogenated rings have also been applied to the coloring of organic solvents, oils, fats, waxes and the like. It is also known that ortho-hydroxyazo dyes and metal compounds thereof can be made by combining a diazotized ortho-aminophenol or ortho-aminonaphthol with 2-hydroxytetrahydronaphthalene and, if desired, treating the dye in substance or on the fiber with an agent which yields metal.

The following examples illustrate the invention, the parts being by weight:—

*Example 1.*—22.75 parts of 1-(4-hydroxy-3-aminophenyl)-hexahydrobenzene hydrochloride are diazotized in the usual manner and the diazo solution is introduced into an alcoholic solution of the sodium salt of 2-hydroxynaphthalene. The dye which has been formed is filtered with suction, dried and ground, whereby it is obtained in the form of a brownish-violet powder.

3.45 grams of the dye powder thus obtained are suspended in 200 cc. of alcohol and the solution is mixed with 8 cc. of a caustic soda solution of 10 per cent. strength. Then there is added a solution of 2.5 grams of cobalt chloride (CoCl₂·6H₂O) in 10 cc. of water and the homogeneous red-violet solution thus obtained is heated for a short time on a water-bath. The solution is then poured into a large quantity of a dilute solution of common salt containing also some dissolved sodium acetate. The complex cobalt compound of the dye which has separated is filtered with suction, washed until free from salt and dried. It dissolves readily in organic compounds to which it imparts a red-violet color.

*Example 2.*—23.7 parts of 1-(4-hydroxy-5-nitro-3-aminophenyl)-hexahydrobenzene are diazotized and the diazo solution is introduced into a solution, heated to 50° C., of 2-aminonaphthalene-hydrochloride. When coupling is finished, the dye is filtered with suction and dried. When ground, it forms a black dye powder.

3.9 grams of the dye powder are dissolved in 50 cc. of pyridine and the solution is heated for about 1 hour at the temperature of the water-bath with a quantity of a freshly precipitated cobalt hydroxide paste corresponding with 0.93 gram of dry cobalt hydroxide. The blue-black solution thus obtained is then allowed to run into a large quantity of a dilute solution of common salt, the complex cobalt compound of the dye which is thus precipitated is filtered with suction, washed until free from salt and then dried. It dissolves readily in organic compounds to which it imparts a blue-black to greenish-black color.

*Example 3.*—23.6 parts of 1-(4-hydroxy-5-nitro-3-aminophenyl)-hexahydrobenzene are diazotized and the diazo solution is allowed to run into a solution of 30 parts of 1-acetamino-8-hydroxynaphthalene-4-sulfonic acid and 16 parts of anhydrous sodium carbonate at 40° C. When coupling is finished, the dye which has been formed is filtered with suction and dried. It is soluble in water to a violet solution and dyes wool with a metachrome mordant navy blue shades of good properties of fastness.

If in Example 3 instead of 30 parts of 1-acetamino-8-hydroxynaphthalene-4-sulfonic acid there are used 26 parts of 1-hydroxynaphthalene-4-sulfonic acid there is obtained a dye which dissolves in water to a red-violet solution and dyes wool in presence of a metachrome mordant dark violet shades.

*Example 4.*—22.75 parts of 1-(4-hydroxy-3-aminophenyl)-hexahydrobenzene hydrochloride are diazotized and the diazo solution is introduced in an alkaline solution of 14.8 parts of 1,2,3,4-tetrahydro-7-hydroxynaphthalene. The dye which has been formed is recovered in the usual manner. 3.4 parts of the dye are transformed into the complex cobalt compound as indicated in Example 1. It dissolves in organic solvents to which it imparts a brown-violet color.

*Example 5.*—22.75 parts of 1-(4-hydroxy-3-aminophenyl)-hexahydrobenzene hydrochloride are diazotized and coupled in a solution containing caustic alkali and 24.3 parts of β-hydroxynaphthoic acid butylamide. The dark violet dye is separated by addition of common salt and recovered in the usual manner. When forming the complex cobalt compound of the dye in the manner as indicated in Example 1, a product is obtained which dissolves readily in organic solvents to which it imparts a clear violet color.

*Example 6.*—22.75 parts of 1-(4-hydroxy-3-aminophenyl)-hexahydrobenzene hydrochloride are diazotized and the diazo compound is allowed to run into a solution containing sodium carbonate and 19.3 parts of N-butyl-4-hydroxyquinolone. The brown dye thus formed is recovered as usual. The cobalt complex compound formed of this dye in the manner described above, dissolves very readily in organic solvents to which it imparts a full red brown solution.

It is obvious that our invention is not limited to the foregoing examples or to the specific details given therein. Thus, for instance, the diazo component may be substituted in the benzene nucleus by other substituents, such as alkyl, alkoxy, nitro or halogen. The corresponding ortho-hydroxyamino compounds of the naphthalene series substituted by a hydroaromatic radicle, likewise, are applicable and yield dyes of similar qualities. Furthermore, instead of cobalt or chromium other heavy metals, such as copper or iron are suited to form the metal complex compound.

What we claim is:
1. The metal complex compounds of dyes corresponding to the general formula

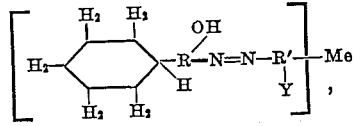

wherein R is a radicle of the benzene series, R' is an aromatic radicle, Y means a metal complex forming substituent of the group consisting of OH and NH₂ and stands in ortho-position to the azo bridge and Me means a metal of the group consisting of cobalt, chromium, copper and iron, said dyes being insoluble in water, but readily soluble in organic solvents.

2. The metal complex compounds of dyes corresponding to the general formula

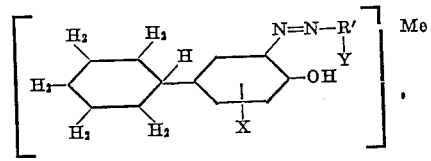

in which X means a univalent radicle of the group consisting of hydrogen, halogen, alkyl, alkoxy and nitro, R' is an aromatic radicle, Y means a metal complex forming substituent of the group consisting of OH and NH₂ and stands in ortho-position to the azo bridge and Me means a metal of the group consisting of cobalt, chromium, copper and iron, said dyes being insoluble in water, but readily soluble in organic solvents.

3. The complex cobalt compounds of the dyes corresponding to the general formula

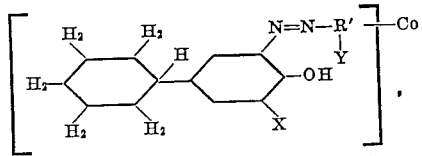

in which X means a univalent radicle of the group consisting of hydrogen, halogen, alkyl, alkoxy and nitro, R' is an aromatic binuclear radicle and Y means a metal complex forming substituent of the group consisting of OH and NH₂, said Y standing in ortho-position to the azo bridge, said dyes being insoluble in water, but soluble in organic solvents.

4. The complex cobalt compound of the dye corresponding to the formula

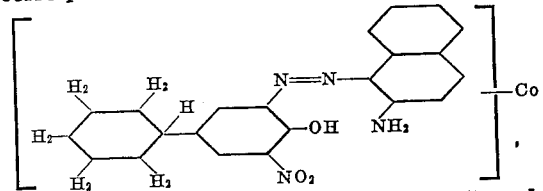

this dye being insoluble in water, but readily soluble in organic solvents to which it imparts a blue-black to greenish black color.

5. The complex cobalt compound of the dye corresponding to the formula

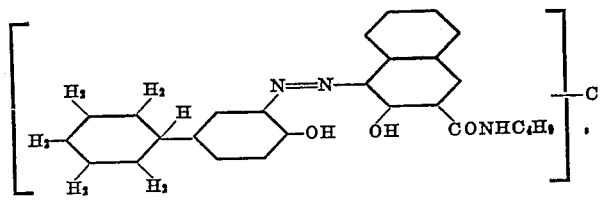

this dye being insoluble in water, but readily soluble in organic solvents to which it imparts a clear violet color.

6. The complex cobalt compound of the dye corresponding to the formula

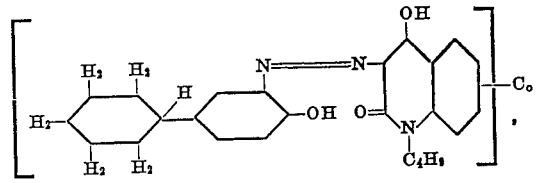

this dye being insoluble in water, but readily soluble in organic solvents to which it imparts a full red brown color.

7. The process which comprises diazotizing an ortho-hydroxyamino compound of the general formula

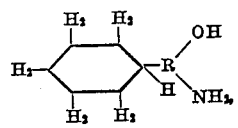

in which R is a radicle of the benzene series, coupling the diazo compound with an aromatic azo coupling component, coupling in ortho-position to a metal complex forming substituent of the group consisting of OH and NH₂ and converting the dye into its metal complex compounds.

8. The process which comprises diazotizing an ortho-hydroxyamino compound of the general formula

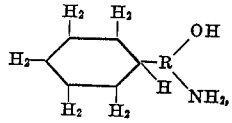

in which R is a radicle of the benzene series, coupling the diazo compound with an aromatic azo coupling component, coupling in ortho-position to a metal complex forming substituent of the group consisting of OH and NH₂ and converting the dye into its cobalt complex compound.

9. The process which comprises diazotizing an ortho-hydroxyamino compound of the general formula

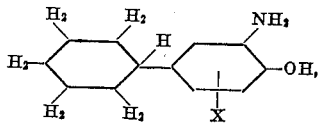

in which X means a univalent radicle of the group consisting of hydrogen, halogen, alkyl, alkoxy and nitro and coupling the diazo compound with a binuclear aromatic azo coupling component, coupling in ortho-position to a metal complex forming substituent of the group consisting of OH and NH₂ and converting the dye into its metal complex compound.

10. The process which comprises diazotizing 1-(4-hydroxy-3-aminophenyl)-hexahydrobenzene, coupling the diazo compound with 2-aminonaphthalene and converting the dye into its cobalt complex compound.

11. The process which comprises diazotizing 1-(4-hydroxy-3-aminophenyl)-hexahydrobenzene, coupling the diazo compound with β-hydroxynaphthoic acid butylamide and converting the dye into its cobalt complex compound.

12. The process which comprises diazotizing 1-(4-hydroxy-3-aminophenyl)-hexahydrobenzene, coupling the diazo compound with N-butyl-4-hydroxy-quinolone and converting the dye into its cobalt complex compound.

HERMANN SCHLADEBACH.
HERBERT HÄHLE.